US006765627B2

(12) United States Patent
Maeda et al.

(10) Patent No.: US 6,765,627 B2
(45) Date of Patent: Jul. 20, 2004

(54) VIDEO PROCESSING CIRCUIT FOR PROCESSING CHARACTER SIGNALS

(75) Inventors: Osamu Maeda, Osaka (JP); Katsuhiro Morisada, Osaka (JP); Toshiaki Irie, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/282,369

(22) Filed: Oct. 29, 2002

(65) Prior Publication Data

US 2003/0048382 A1 Mar. 13, 2003

Related U.S. Application Data

(63) Continuation of application No. 09/277,358, filed on Mar. 26, 1999, now Pat. No. 6,538,703.

(30) Foreign Application Priority Data

Mar. 27, 1998 (JP) ........................................ UM 10-1881

(51) Int. Cl.[7] ........................ H04N 5/445; H04N 5/268; H04N 9/74
(52) U.S. Cl. ........................ 348/725; 348/706; 348/468; 348/563; 348/600
(58) Field of Search ................................. 348/553, 468, 348/465, 563, 569, 570, 564, 600, 705, 706, 725, 589; H04N 5/445, 5/50, 9/76, 9/74, 5/268

(56) References Cited

U.S. PATENT DOCUMENTS

| 5,396,297 | A |   | 3/1995  | Shindou et al. |         |
|-----------|---|---|---------|----------------|---------|
| 5,602,598 | A | * | 2/1997  | Shintani       | 348/565 |
| 5,880,789 | A | * | 3/1999  | Inaba          | 725/137 |
| 5,900,913 | A | * | 5/1999  | Tults          | 348/468 |
| 5,920,355 | A | * | 7/1999  | Kim            | 348/569 |
| 5,990,940 | A | * | 11/1999 | Hashimoto et al. | 348/184 |
| 5,991,832 | A | * | 11/1999 | Sato et al.    | 710/33  |
| 5,995,159 | A | * | 11/1999 | Bae et al.     | 348/563 |
| 6,034,738 | A | * | 3/2000  | Sparks         | 348/564 |
| 6,208,383 | B1 | * | 3/2001 | Park           | 348/468 |
| 6,226,047 | B1 | * | 5/2001 | Ryu            | 348/569 |
| 6,226,053 | B1 | * | 5/2001 | Cho            | 348/705 |
| 6,259,487 | B1 | * | 7/2001 | Bril           | 348/553 |
| 6,307,596 | B1 | * | 10/2001 | Cho           | 348/563 |

FOREIGN PATENT DOCUMENTS

| EP | 0720362   |   | 12/1995 |
|----|-----------|---|---------|
| EP | 0802674   |   | 4/1997  |
| JP | 60229480  | * | 11/1985 |
| JP | 61121077  | * | 7/1986  |
| JP | 63199177  | * | 9/1987  |
| JP | 6330089   | * | 2/1988  |
| JP | 63121365  | * | 5/1988  |
| JP | 631446665 | * | 6/1988  |
| JP | 01137676  | * | 9/1989  |
| JP | 02195783  | * | 8/1990  |
| JP | 03263090  | * | 11/1991 |
| JP | 04207673  | * | 7/1992  |

OTHER PUBLICATIONS

European Patent Office Search Report, citing the references above for BE 9900214.
European Patent Office Search Report for EP 0 720 362 A2 noted above (attached to back of the above reference).
EP 0 720 362 A3 (abstract only) of the above reference the A3 publication.

* cited by examiner

*Primary Examiner*—Sherrie Hsia
(74) *Attorney, Agent, or Firm*—Myron Greenspan; Lackenbach & Siegel LLP

(57) ABSTRACT

A video processing circuit for receiving a video signal from a tuner or a video recording/reproducing apparatus through a first or second input terminal and for outputting the video signal as it is through an output terminal under one condition and outputting a character signal from a signal source thereof instead of the video signal through the output terminal or outputting the video signal with the character signal superimposed thereon from the output terminal under the other condition. In the video processing circuit, among a plurality of circuits interposing from the first and second input terminals to the output terminal, only circuits related to the signal source of the character signal are formed in one integrated circuit (second integrated circuit) and the other circuits are formed in the other integrated circuit (first integrated circuit).

14 Claims, 4 Drawing Sheets

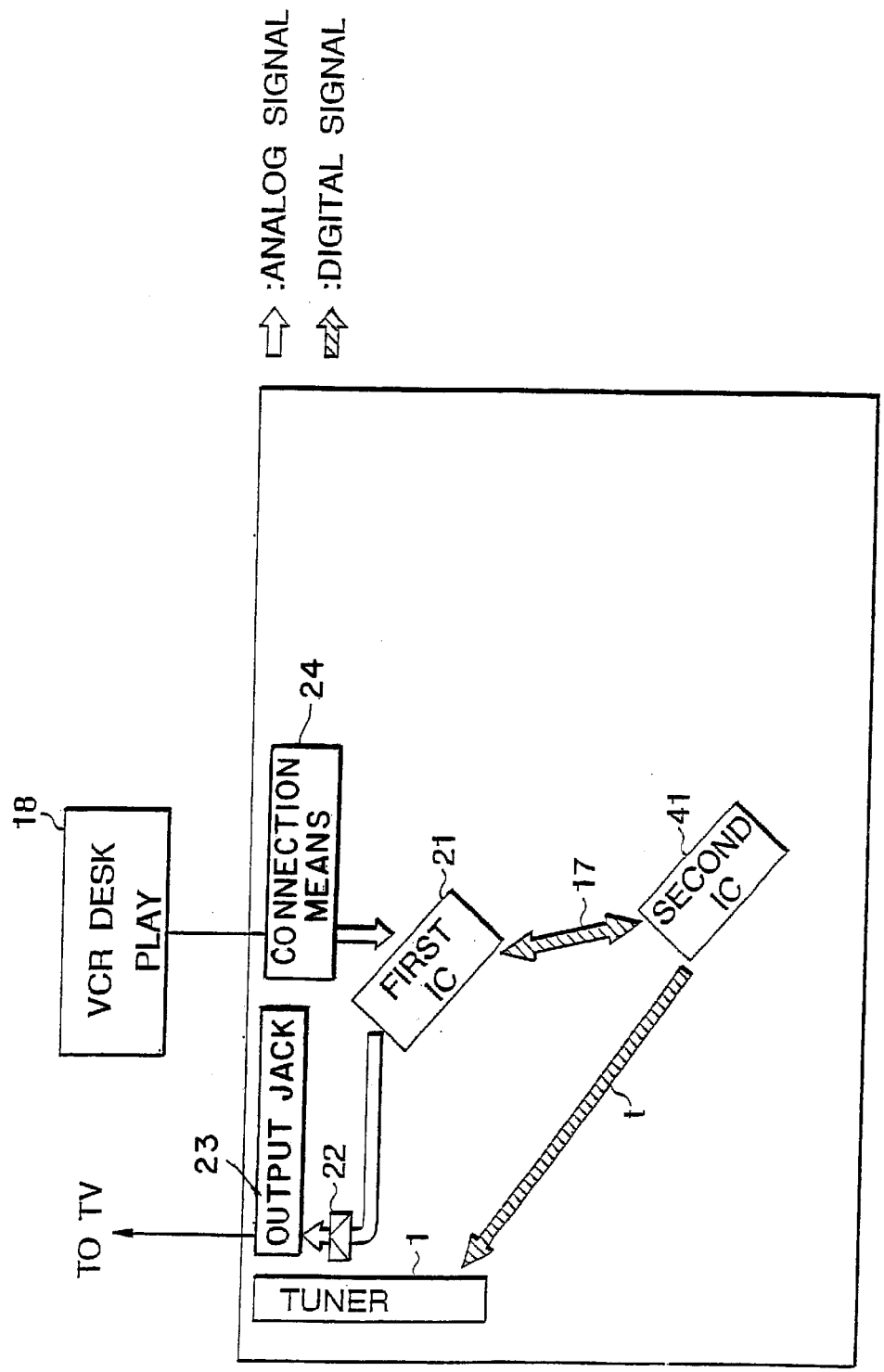

VIDEO PROCESSING CIRCUIT FOR PROCESSING CHARACTER SIGNALS

This application is a Continuation of U.S. patent application Ser. No. 09/277,358 filed Mar. 26, 1999, issued as U.S. Pat. No. 6,538,703 on Mar. 25, 2003, which in turn claims priority from JP Application No. Hei. 10-1881 filed Mar. 27, 1998.

BACKGROUND OF THE INVENTION

1. Field of the Invention

This invention relates to a video processing circuit for superimposing a character signal on a video signal.

2. Description of the Related Art

Recent television receivers are so devised as to indicate, for example, a channel with a number on the television screen and the sound volume by increasing or decreasing the number of vertical bars; in other words, such a television receiver displays characters such as symbols, numerals and the like on the screen. In order to prevent the screen from flickering or noise resulting in unwanted signals appearing on the picture when one channel is switched to another, a blue background (a blue-back screen) has been adopted so that the whole background of the television screen turns blue when or after channels are switched. Furthermore, operations relative to a video recording/reproducing apparatus, for example, reserving video tape recording (setting of a video tape recording date, designating of a channel, etc.), adjusting the internal clocking of the apparatus and the like are displayed on the screen as a menu.

When integrated circuits for character display are designed, taking various measures and considerations is needed to prevent the circuits for processing video signals from being affected by external noise because the video signals are easily affected thereby. On the other hand, character signals and control circuits are difficult to deal with because the character signals and the control circuits are not so much affected by external noise.

In conventional circuits for processing character signals, a high-speed switching control signal is used to switch between video and character signals in a superimposing circuit in order to superimpose the character signal on the video signal. Consequently, a high-speed switching signal is needed and this develops a problem of causing the switching signal to interfere with peripheral circuits and this results in producing interfering noise. Still another problem is what arises from a timing lag due to disturbance of the synchronization of the character signal with the switching signal.

Moreover, crystal resonators are needed for a reference frequency generator of a character signal generator, a color signal generator for generating a monochromatic (blue-back) screen and a switching signal generator for superimposing the character signal on the video signal. When a changeover switch is used for superimposing the character signal on the video signal, a switching operation in the order of one microsecond is needed and such a high-speed switch is very expensive. Consequently, switching noise is likely to affect the peripheral circuits. It is therefore extremely difficult to incorporate the switching circuit in the IC circuit for video signal processing. In addition, a special signal line is required to effect control over the high-speed switching operation; in other words, a great deal of labor and cost may be incurred to solve those many problems mentioned above.

Japanese Patent Unexamined Publication No. Sho. 63-30089, which is not technically and directly related to the present invention though, discloses a technique of employing a frequency four times higher than a color subcarrier frequency for measuring instruments. More specifically, as described in that publication, "at the time of taking steps of adjusting and inspecting the characteristics during the manufacture of a color television camera, it is necessary to measure waveforms of a composite video signal as an output of the camera, of a color difference signal synchronizing with the composite video signal and the like . . . . a signal having a frequency four times higher than the color subcarrier frequency, that is, a frequency of 4 fsc is used as, for example, a timing signal for controlling various kinds of measurement." That is, it is disclosed therein to employ a signal of 4 fsc for measuring instruments during the manufacture of the camera.

Conventional video processing circuits for processing character signals will now be described with reference to the accompanying drawings. FIGS. 4 to 6 are block diagrams illustrating the conventional video processing circuits for processing character signals. As shown in FIG. 4, a composite video signal is supplied from a tuner 1 to a composite video signal processing circuit 2 and then to an OSD (On Screen Display) circuit 3. A microcontroller 4 generates a control signal and supplies the control signal to the OSD circuit 3 via a control bus 5. In other words, the microcontroller 4 sends, to the OSD circuit 3 via the control bus 5, control signals in the form of code signals representing various characters, for example, a numeral for indicating a channel number, several vertical bars for indicating the sound volume, characters for indicating reproducing and recording operations when a VCR is operated and the like by the use of a means for detecting any one of the operations performed by a viewer or an operating condition that has been inputted. Further, the microcontroller 4 generates and supplies a control signal to the OSD circuit 3 so that these characters are added to the video signal in the OSD circuit 3 or a picture is generated therein as a substitute. A clock oscillator with a crystal resonator 6 (resonance frequency: 16 MHz) externally attached thereto is set in the microcontroller 4, and the OSD circuit 3 is controlled by the control signal outputted from the microcontroller 4. The video signal is supplied to the OSD circuit 3 in which characters are added to the video signal, which is then supplied to a video signal output circuit (not shown) at the following stage. In a case where the output video signal of the video signal processing circuit 2 is so bad in quality that it is not fit for viewing and listening or where a menu and the like are desired to be displayed on the whole screen, the blue background (blue-back) generated by the OSD circuit 3 is made to appear on the screen under the control by the microcontroller 4.

In this circuit arrangement, a crystal resonator 7 for generating a color subcarrier signal (3.58 MHz) is provided in the color synchronizing circuit incorporated in the video signal processing circuit 2 and a crystal resonator (14.3 MHz) 8 is provided in the OSD circuit 3 and besides the crystal resonator (16 MHz) 6 is also provided in the microcontroller 4 as described above. However, three oscillating circuits by means of the three crystal resonators are considerably costly to maintain their stable operation against temperature variation, variation with time and the like.

FIG. 5 shows a circuit further developed from which is shown in FIG. 4, wherein an OSD circuit is incorporated in the microcontroller 4 and the circuit arrangement is much simplified and operated in the same way as what is shown in FIG. 4. Even in this case, three crystal resonators 6, 7 and 8 are required likewise as in the case of FIG. 4.

The conventional circuits shown in FIGS. 4 and 5 poses the following problems.

(a) Since the microcontroller 4 always has the built-in clock oscillator (usually with a frequency of 10+several MHz and an amplitude of 5 V), the video signal is affected by the output of the clock oscillator.

(b) Conversely, a microcomputer circuit may be affected by the video signal when a video signal having a high energy level is passed therethrough.

(c) The conventional microcontroller 4 has the built-in driving circuit (not shown) of a fluorescent display tube (FLD) and when the video signal is passed through the microcontroller 4, the video signal is affected by the noise generated by the driving circuit of the fluorescent display tube.

(d) Even in a circuit having no built-in driving circuit of the fluorescent display tube, the video signal passing through the microcontroller 4 is affected by the noise generated by the driving circuit of the fluorescent display tube disposed close to the microcontroller 4.

Thus, the conventional circuits have many problems as described above and the disadvantage is that a great deal of labor and cost may be incurred when some measures are taken to solve these problems.

FIG. 6 shows still another conventional circuit. The microcontroller 4 has functions of generating characters, a blue-back screen and the like out of those performed by the OSD circuit. Moreover, an external switching circuit 9 performs the operation of adding characters to the video signal and making the generated blue-back screen appear alternatively. This operation is substantially the same as what is shown in FIG. 4. However, the influence of noise deriving from the driving circuit of the fluorescent display tube is reduced because the video signal in the video signal processing circuit 2 is separated from the driving circuit of the fluorescent display tube.

Even in this case, however, the following problems develop and the problem of necessitating many crystal resonators has not been solved yet.

(i) At the time of the aforementioned superimposition, the switching circuit 9 has to perform the switching operation in the order of one microsecond and therefore a high-speed, expensive switching circuit is needed.

(ii) Since the switching circuit 9 performs the high-speed switching operation, the peripheral circuits may be affected by the switching noise.

(iii) Consequently, it is difficult to incorporate the switching circuit in the video IC of the video signal processing circuit.

(iv) A special signal line becomes necessitated because control is specifically needed to effect the high-speed switching.

Even this circuit has many problems to be solved and a great deal of time and cost may be incurred when some measures are taken to solve these problems. Although there is a document (e.g., Toshiba Review 1994, Vol. 49, No. 7, Item 2.5 on page 516) describing the provision of a built-in switching circuit in the video signal processing circuit 2, simply providing the built-in switching circuit still poses the same problems as mentioned above and has not been led to complete solution.

SUMMARY OF THE INVENTION

It is an object of the present invention to provide a video processing circuit fit for integration by solving the problems pertaining to the conventional video processing circuit for processing a character signal, the problems including necessitating a high-speed switching signal in a superimposing circuit when the character signal is superimposed on a video signal because the video signal and the character signal are switched with the high-speed switching control signal, causing peripheral circuits to be badly affected by switching noise accompanied by a high-speed switching operation (noise interference when an analog circuit and a digital circuit are integrated into one IC), causing a timing lag by disturbance of the synchronization of the character signal with the switching signal, and difficulties in the circuit integration.

Furthermore, it is another object of the present invention to provide a video processing circuit fit for integration and capable of solving the problems pertaining to the conventional video processing circuit, the problems including necessitating a plurality of crystal resonators and an expensive high-speed switch, difficulties in making an IC circuit for processing a video signal incorporate the switching circuit, and a great deal of cost incurred by taking some measures to solve the problems.

In order to achieve the above objects, the present invention provides a video processing circuit for receiving a video signal from a tuner or a video recording/reproducing apparatus through a first or second input terminal and for outputting the video signal as it is through an output terminal under one condition and outputting a character signal from a signal source thereof instead of the video signal through the output terminal or outputting the video signal with the character signal superimposed thereon from the output terminal under the other condition, wherein among a plurality of circuits interposing from the first and second input terminals to the output terminal, only circuits related to the signal source of the character signal are formed in one integrated circuit and the other circuits are formed in the other integrated circuit.

BRIEF DESCRIPTION OF THE DRAWINGS

FIG. 3 is a block circuit diagram illustrating first and second integrated circuits which are provided separately in the video processing circuit.

DETAILED DESCRIPTION OF THE PREFERRED EMBODIMENT

Figure 1:
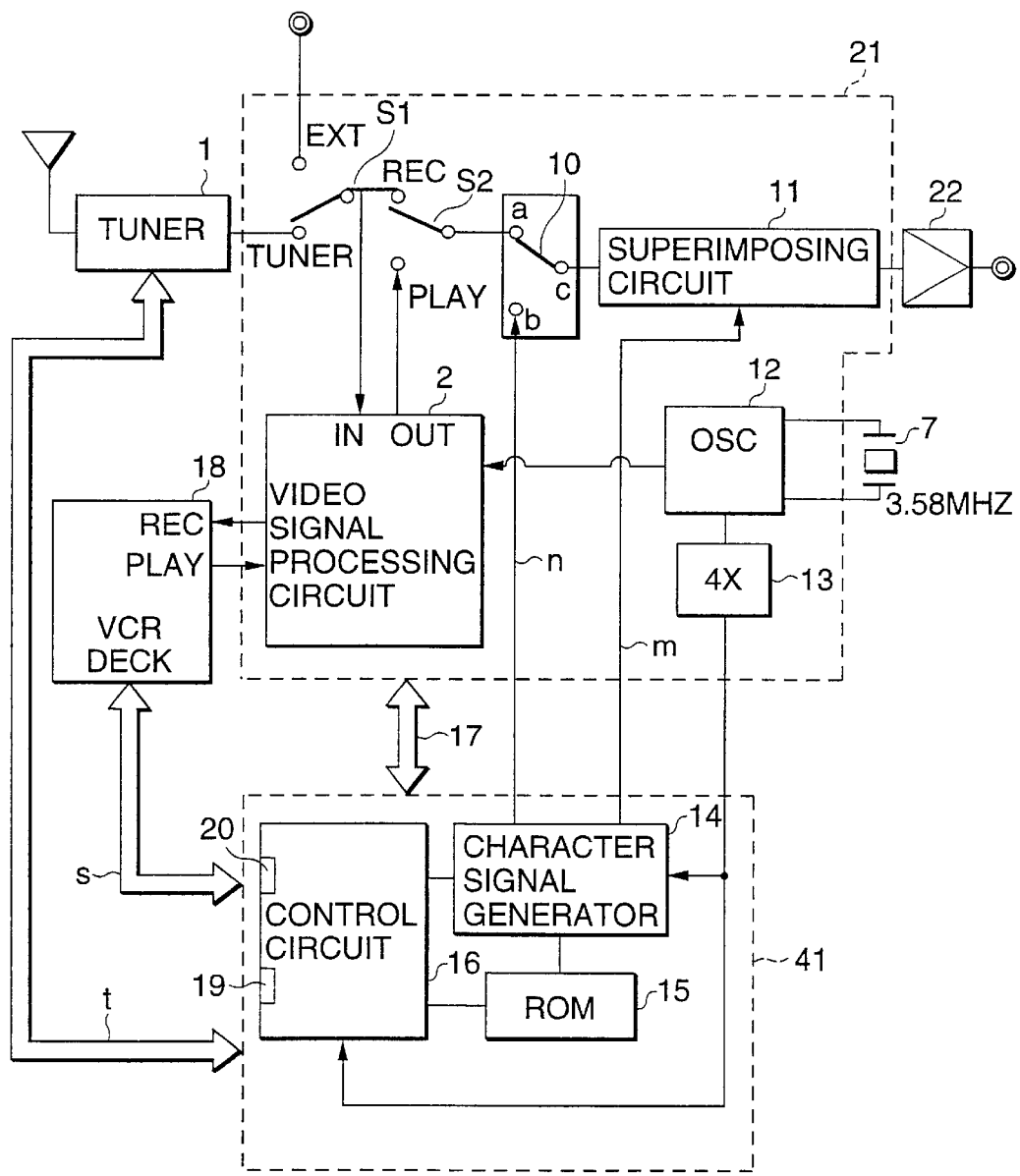
FIG. 1 is a block circuit diagram illustrating an electric arrangement in a video processing circuit embodying the present invention.
Figure 4:
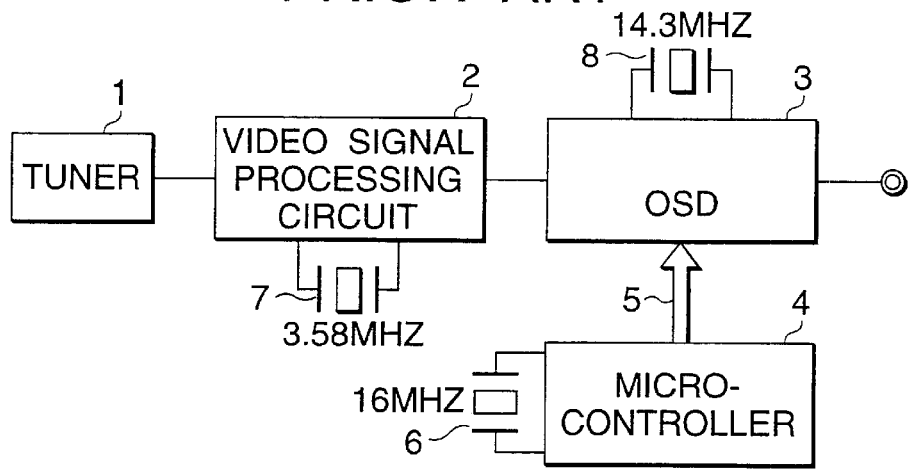
FIG. 4 is a block circuit diagram illustrating a conventional video processing circuit for processing character signals.
Figure 5:
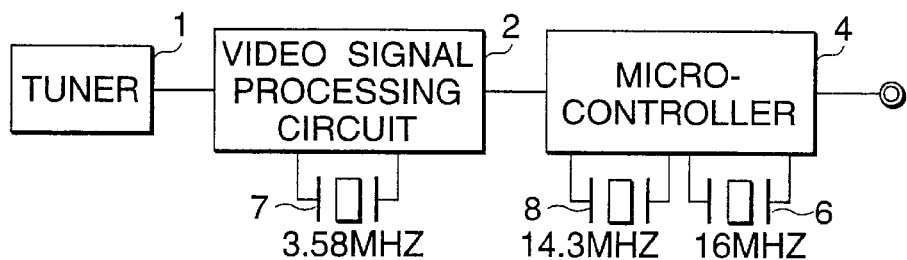
FIG. 5 is a block circuit diagram illustrating another conventional video processing circuit for processing character signals.
Figure 6:
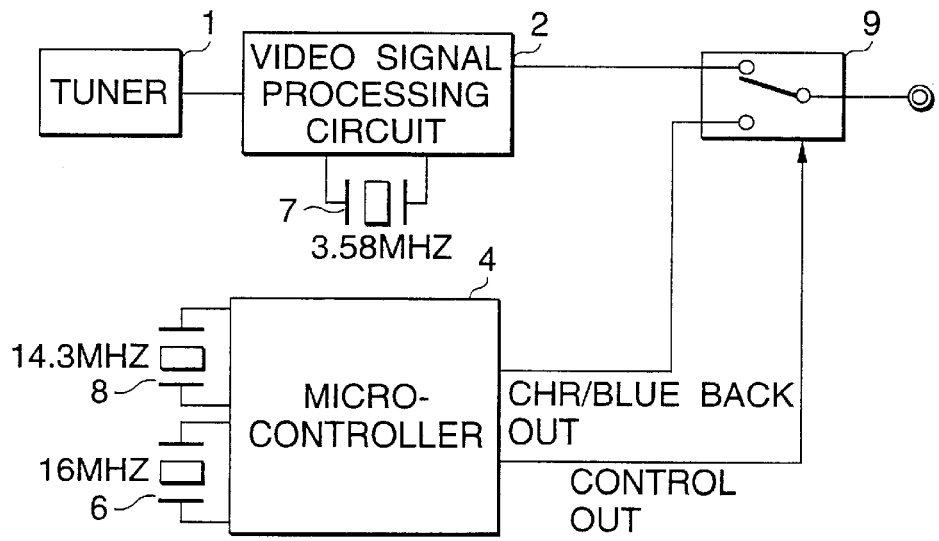
FIG. 6 is a block circuit diagram illustrating still another conventional video processing circuit for processing character signals.

A video processing circuit for processing character signals according to an embodiment of the invention will now be described with reference to FIG. 1. In FIG. 1, like circuits operating in substantially the same way as what is shown in FIGS. 4 to 6 are designated by like reference numerals.

In a first integrated circuit (IC) 21 incorporating a video signal processing circuit 2, there exist built-in circuits including the video signal processing circuit 2, a switching circuit 10 for switching between a video signal supplied from the preceding stage and a specific picture signal, and a superimposing circuit 11 for adding a character signal or the like to the video signal or the specific picture signal supplied from the switching circuit 10.

A color subcarrier oscillating circuit 12 is provided in the first integrated circuit 21 and operated with a crystal resonator 7 to oscillate a frequency signal of 3.58 MHz, this signal being used as a color signal demodulating reference signal. Further, a signal of 14.3 MHz resulting from four-time multiplying the frequency by means of a multiplier 13 is used for a clock signal of a CCD delay element (not shown). The 14.3 MHz signal resulting from the four-time multiplication is taken out via a buffer amplifier (not shown).

In a second integrated circuit (IC) 41 incorporating a microcontroller, there exist built-in circuits including the microcontroller, a character signal generator 14, a ROM 15 in which pattern signals of the character signal generator 14 are stored, a control circuit 16 (microcomputer), a picture generating circuit for generating a blue-back screen and the like, these circuits being integrated into the IC. The output signal of the character signal generator 14 is supplied to the superimposing circuit 11 via a signal line m, and two kinds of picture signals (specific picture signals) including a blue-back picture signal and a picture signal resulting from adding the character signal to the blue-back picture signal are supplied from the character signal generator 14 to the terminal b of the switching circuit 10.

In order to superimpose the character signal on the video signal, the video signal and the character signal are not switched by means of a high-speed switching control signal but switched by detecting the level of the character signal itself in the superimposing circuit 11. In other words, the superimposing circuit 11 functions as what detects the level of the character signal and if the level of the character signal is lower than a predetermined level, the superimposing circuit 11 outputs the video signal received as it is to an amplifier 22 and if the level of the character signal is higher than the predetermined level, the superimposing circuit 11 superimposes the character signal on the video signal received and outputs this combination to the amplifier 22. A character signal to be superimposed thereon need not be the character signal received but may be easily considered to be the character signal optionally subjected to level shifting, for example. In such a superimposing circuit, two conditions are switchable; namely, one condition in which the video signal is outputted as it is as an output signal and the other condition in which a signal resulting from superimposing the character signal on the video signal is outputted as the output signal. In this case, the character signal is used as a switching signal between the two conditions. Thus, the pulse-like high-speed switching signal becomes unnecessary with the effect of suppressing the generation of noise. Furthermore, the problem of causing a timing shift resulting in disturbing the synchronization of the character signal with the switching signal is prevented from arising in principle.

Figure 2A:
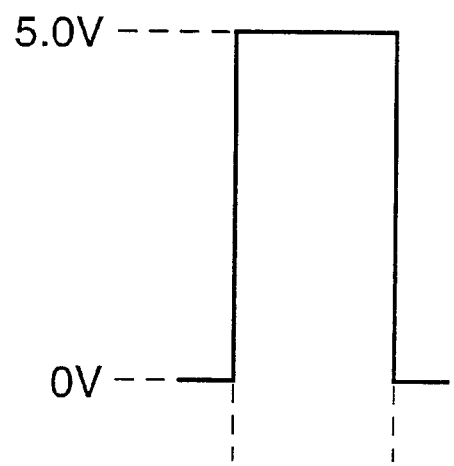
FIGS. 2(a) to 2(c) are waveform charts illustrating amplitude waveforms for use in the video processing circuit according to the present invention.
Figure 2B:
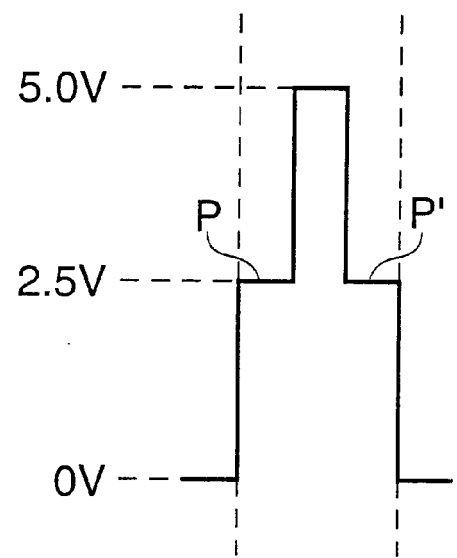

Moreover, specifically-contrived character signal waveforms are provided according to the present invention. FIG. 2(a) shows an ordinary amplitude waveform and FIG. 2(b) shows an amplitude waveform for use in the present invention. In the latter case, a white level (e.g., 5 V) and a gray level (e.g., 2.5 V) are set in a character signal and one stepped portion (P) (P') is set in the middle of the amplitude waveform so that the signal may not rise from 0 V up to 5 V at a stroke. Generally, a higher harmonic component contained in a rectangular wave signal has greater energy as a variation in amplitude becomes greater. Therefore, the higher harmonic energy can be suppressed low by setting 2.5 V level in the middle of the variation between 0 V and 5 V. In so doing, a high-quality video output is obtainable without any problem even the character signal superimposing circuit 11 together with the integrated circuit of the video signal processing circuit is formed into the IC. Moreover, this 2.5 V (the gray level) allows characters to be displayed at a high quality level when the gray level is employed for character hemming.

Figure 2C:
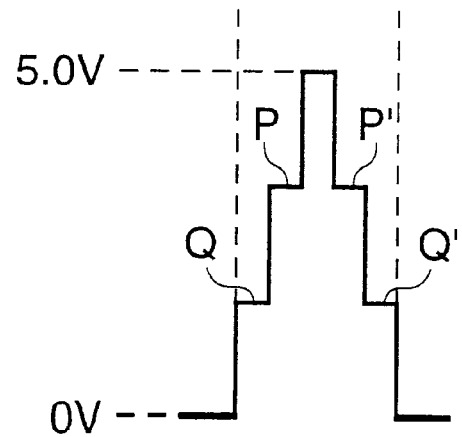

FIG. 2(c) shows an example of a case where two stepped portions (P) (P') and (Q) (Q') are set. In this case, it is possible to suppress the higher harmonic energy further.

The switching circuit 10, and switches S1 and S2 are controlled by the control bus 17 ($I^2C$ bus) of the second integrated circuit 41. The connecting terminal of the switching circuit 10 is normally connected to an a-side as shown in FIG. 1 and the video signal at the preceding stage is supplied thereto. The connecting terminal of the switching circuit 10 is connected to a b-side so as to output a picture generated in the microconroller, in response to a case where the video signal is unfit for viewing and listening as noted previously, the operation performed by a viewer, the instructions from the microcontroller and the like. When the video signal from the preceding stage is unfit for viewing and listening, the blue-back screen is outputted and when a menu picture is displayed, the blue-back screen with the characters added is supplied to the signal line n. Although use can be made of a method of supplying the character signal to the signal line m and supplying the blue-back screen to the signal line n so as to superimpose both in the superimposing circuit 11, the picture quality may be deteriorated because color oozing occurs through the edge of the character. Hence, the aforementioned method is adopted.

Thus, the superimposing circuit 11 can be constructed to be a circuit free from being affected by the higher harmonic noise by providing the specifically-contrived character signal waveforms without necessitating the pulse-like high-speed switching control signal.

The 14.3 MHz signal taken out of the multiplier 13 is supplied as a reference signal for the OSD circuit (including a character generator in this case) and the control circuit 16 (microcomputer) and used as the reference signal for generating the blue-back color signal in the OSD circuit. As the color signal from the video signal processing circuit 2 can be synchronized in phase with the blue-back color signal generated in the OSD circuit, any inconvenience arising from the flickering of the screen of the television monitor is obviated in principle when the color signals are switched.

Further, the 14.3 MHz signal is also supplied to the control circuit (microcomputer) 16 and used as a reference clock signal during the control operation. Here, 14.3 MHz is usable without any problem because the operation frequency of the microcomputer is within the range of 8 to 16 MHz. However, slight modification of software is needed in a portion such as a servo system in a VCR circuit 18 where time has to be measured. Thus, the number of heretofore employed expensive crystal resonators of 3.58 MHz for the color signal processing, 14.3 MHz for the OSD and 16 MHz for the control microcomputer can be reduced from three to one with the effect of allowing making a low-cost circuit arrangement.

Incidentally, (s) and (t) represent a control bus for controlling a VCR mechanism (deck) 18 and a control bus for controlling a tuner 1, respectively. Reference numerals 19 and 20 designate interface circuits provided in the control circuit and used as interfaces with the tuner 1 and the VCR deck 18, respectively.

In the video processing circuit according to the present invention, the first integrated circuit 21 for analog processing and the second integrated circuit 41 for digital processing are provided separately from each other, as apparent also from FIG. 3. Further, in FIG. 3, the amplifier 22 is connected to an output jack 23, and a connection means 24 is provided between the VCR deck 18 and the first integrated circuit 21 (specifically, the video signal processing circuit 2).

According to the present invention, there is provided a video processing circuit for receiving a video signal from a tuner or a video recording/reproducing apparatus through a first or second input terminal and for outputting the video signal as it is through an output terminal under one condition and outputting a character signal from a signal source thereof instead of the video signal through the output terminal or outputting the video signal with the character signal superimposed thereon from the output terminal under the other condition, wherein among a plurality of circuits interposing from the first and second input terminals to the output terminal, only circuits related to the signal source of the character signal are formed in one integrated circuit and the other circuits are formed in the other integrated circuit. Thus, the character signal can be superimposed on the video signal using a simple circuit arrangement and this makes it possible to switch between the video signal and the specific picture signal smoothly, which results in facilitating the integration of the circuit for processing the video signal because the circuit therefor is hardly affected by external noise.

What is claimed is:

1. A video processing circuit for receiving a video signal from a tuner or a video recording/reproducing apparatus through a first or a second input terminal and for outputting the video signal as it is through an output terminal under one condition and outputting a character signal from a signal source thereof instead of the video signal through the output terminal or outputting the video signal with the character signal superimposed thereon from the output terminal under the other condition, wherein among a plurality of circuits interposing from the first and second input terminals to the output terminal, only circuits related to the signal source of the character signal are formed in one integrated circuit and the other circuits are formed in the other integrated circuit.

2. A video processing circuit for receiving a video signal from a tuner or a video recording/reproducing apparatus through a first or second input terminal and for outputting the video signal as it is through an output terminal under one condition and outputting a character signal from a signal source thereof instead of the video signal through the output terminal or outputting the video signal with the character signal superimposed thereon from the output terminal under the other condition, wherein among a plurality of circuits interposing from the first and second input terminals to the output terminal, only circuits related to the signal source of the character signal are formed in one integrated circuit and the other circuits are formed in the other integrated circuit, and wherein the character signal is superimposed on the video signal by switching the video and character signals by detecting the level of the character signal and superimposing the character signal on the video signal only when the detected character signal exceed a predetermined level.

3. A video processing circuit for receiving a video signal from a tuner or a video recording/reproducing apparatus through a first or second input terminal and for outputting the video signal as it is through an output terminal and outputting a character signal from a signal source thereof instead of the video signal through the output terminal or outputting the video signal with the character signal superimposed thereon from the output terminal only when the character signal exceeds a predetermined nonzero level, wherein among a plurality of circuits interposing from the first and second input terminals to the output terminal, only circuits related to the signal source of the character signal are formed in one integrated circuit and the other circuits are formed in the other integrated circuits.

4. The video processing circuit as claimed in claim 3, wherein: the circuits related to the signal source of the character signal which are formed in said one integrated circuit include a character signal generator and an ROM having a plurality of character patterns stored therein.

5. The video processing circuit as claimed in claim 3, wherein: the circuits related to the signal source of the character signal which are formed in said one integrated circuit include a character signal generator, an ROM having a plurality of character patterns stored therein and a control circuit for controlling the character signal generator and the ROM.

6. The video processing circuit as claimed in claim 3, wherein: said other integrated circuit is provided with a third and fourth input terminals for the character signal from said one integrated circuit in addition to the first and second input terminals, and wherein a switching circuit for automatic switching between the video signal received through the first or second input terminal and the character signal received through the third input terminal and a superimposing circuit for superimposing the character signal received through the fourth input terminal on the video signal or the character signal to be switched by the switching circuit are formed in said other integrated circuit.

7. A video processing circuit for receiving a video signal from a tuner or a video recording/reproducing apparatus through a first or second input terminal and for outputting the video signal as it is through an output terminal under one condition, and outputting a character signal from a signal source thereof instead of the video signal through the output terminal or outputting the video signal with the character signal superimposed thereon from the output terminal under the other condition, and wherein the character signal is superimposed on the video signal by switching the video and character signals by detecting the level of the character signal and superimposing the character signal on the video signal only when the detected character signal exceed a predetermined level.

8. A video processing circuit as defined in claim 7, wherein:

among a plurality of circuits interposing from the first and second input terminals to the output terminal, only circuits related to the signal source of the character signal are formed in one integrated circuit and the other circuits are formed in the other integrated circuit.

9. A video processing circuit as defined in claim 7, wherein: said predetermined level is a non-zero level.

10. A video processing circuit for receiving a video signal from a tuner or a video recording/reproducing apparatus through a first or second input terminal and for outputting the video signal as it is through an output terminal and outputting a character signal from a signal source thereof instead of the video signal through the output terminal or outputting the video signal with the character signal superimposed thereon from the output terminal only when the character signal exceeds a predetermined nonzero level.

11. The video processing circuit as claimed in claim 10, wherein: among a plurality of circuits interposing from the first and second input terminals to the output terminal, only circuits related to the signal source of the character signal are formed in one integrated circuit and the other circuits are formed in the other integrated circuit.

12. The video processing circuit as claimed in claim 10, wherein: the circuits related to the signal source of the character signal which are formed in said one integrated circuit include a character signal generator and a separate ROM having a plurality of character patterns stored therein.

13. The video processing circuit as claimed in claim 10, wherein: the circuits related to the signal source of the character signal which are formed in said one integrated circuit include a character signal generator, an ROM having a plurality of character patterns stored therein and a control circuit for controlling the character signal generator and the ROM.

14. The video processing circuit as claimed in claim 10, wherein: said other integrated circuit is provided with a third and fourth input terminals for the character signal from said one integrated circuit in addition to the first and second input terminals, and wherein a switching circuit for switching between the video signal received through the first or second input terminal and the character signal received through the third input terminal and a superimposing circuit for superimposing the character signal received through the fourth input terminal on the video signal or the character signal to be switched by the switching circuit are formed in said other integrated circuit.

* * * * *